United States Patent Office 3,393,190
Patented July 16, 1968

3,393,190
WATER-INSOLUBLE MONOAZO DYESTUFFS
Paul L. Stright, Hamburg, N.Y., assignor to Allied Chemical Corporation, New York, N.Y., a corporation of New York
No Drawing. Filed Apr. 7, 1965, Ser. No. 446,379
9 Claims. (Cl. 260—155)

ABSTRACT OF THE DISCLOSURE

Water insoluble monoazo dyestuffs derived by coupling a diazotized 2-aminopyridine-1-oxide with a 2,4-dihydroxyquinoline or a compound containing the radical —CH$_2$CO— which are 1,3-diketones or pyrazolones, capable of undergoing keto-enol tautomerism and free of water-solubilizing groups; the dyestuffs of the present invention are useful for dyeing metal-containing polymers of alpha olefins having 2–4 carbon atoms, particularly polypropylene.

---

The present invention relates to the process of dyeing metal-containing polyolefins with metallizable monoazo dyestuffs derived from diazotized 2-aminopyridine-1-oxides. It further relates to novel, metallizable, monoazo dyestuffs which are derived by coupling diazotized 2-aminopyridine-1-oxides with a coupling component containing an active methylene group.

It is known that polyolefin fibers have poor dyeing properties due to chemical inertness and the absence of receptive sites. Numerous techniques have been devised to circumvent this difficulty with varying degrees of success, but none has proved entirely satisfactory. A more successful technique, disclosed in my co-pending application, Ser. No. 261,858, filed Feb. 28, 1963, and now U.S. Patent No. 3,254,072, involves the application to metal-containing polypropylene of 2 - (8-quinolylazo)-1,3-diketones, which are capable of forming Werner type complexes with many metals. Although, as described in said co-pending application, these quinolylazo dyes are generally suitable for the coloration of olefinic polymers containing metals such as nickel, zinc, cobalt, copper, cadmium, titanium, aluminum, iron, zirconium, maganese, vanadium and the like transition group of elements, some are lacking in certain desirable dyeing properties, i.e., uniformity, compatibility and penetration.

According to the present invention, it has now been found that metallizable water-insoluble monoazo dyestuffs of the disperse type, which are obtained by diazotizing 2-aminopyridine-1-oxides and coupling the same with suitable compounds containing at least one group capable of forming a chelate with a metal, possess excellent dyeing characteristics for metal-containing polymers of α-olefins having 2–4 carbon atoms, particularly polypropylene. Suitable coupling compounds include, for example, phenols, naphthols, 1,3-diketones, pyrazolones and quinolines which are free of water-solubilizing substituents. Piece goods of polypropylene fibers containing metal are dyed with the above-described dyestuffs in deep level shades having excellent fastness to light, washing, dry cleaning, cracking, ozone, oxides of nitrogen, sublimation and chlorine.

The novel dyestuffs of my invention are water-insoluble monoazopyridine-1-oxides conforming to the general formula:

A—N=N—C wherein A represents a pyridine-1-oxide residue and C represents the residue of a coupling component which is a 2,4-dihydroxyquinoline or a compound containing the radical —CH$_2$—CO—. Coupling components of the latter class are more specifically identified as compounds capable of undergoing keto-enol tautomerism. Examples of keto-enolizable compounds suitable for use in preparing the novel dyestuffs of the present invention include 1,3-diketones and pyrazolones which are free of water-solubilizing substituents. It is highly probable that keto-enol tautomerism characteristics of such compounds play an important role in the metallization of the dyes of this invention containing the same when applied to metal-containing polyolefins.

The preferred pyridine-1-oxide residue may be represented by the general formula:

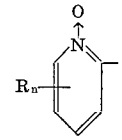

wherein R represents a lower alkyl or alkoxy group containing 1–6 carbon atoms, halogen or nitro; and n is an integer of 0–3.

The novel dyestuffs of the present invention can be prepared by the conventional methods of preparing monoazo dyestuffs. In accordance with the well known practices in this art, a 2-aminopyridine-1-oxide of the class described above is diazotized with nitrous acid and the diazonium salt solution is coupled in a weakly alkaline medium with the coupling component. The resultant monoazo coupling product is generally insoluble in the coupling mixture, from which the coupling product can be isolated in any suitable manner, e.g., by filtration or centrifugation. The isolated product can be purified, if desired, by reslurrying in slightly acidified water. The monoazo compounds are generally ground in the presence of dispersing agents in a conventional manner to obtain a satisfactory dyestuff composition dispersible in water.

Examples of 2-aminopyridine-1-oxides useful in the preparation of the dyestuffs of this invention are:

2-aminopyridine-1-oxide
2-amino-3-methylpyridine-1-oxide
2-amino-5-ethoxypyridine-1-oxide
2-amino-4-methylpyridine-1-oxide
2-amino-6-methylpyridine-1-oxide
2-amino-4,6-dimethylpyridine-1-oxide
2-amino-3,5-dibromopyridine-1-oxide
2-amino-4-n-butylpyridine-1-oxide
2-amino-5-n-butoxypyridine-1-oxide
2-amino-4-ethyl-6-methylpyridine-1-oxide
2-amino-5-n-hexyl-3-methylpyridine-1-oxide
2-amino-4-nitropyridine-1-oxide Examples of coupling components suitable for the preparation of the novel dyes of my invention are:

2,4-pentanedione
1-phenyl-1,3-butanedione
1-(4-chlorophenyl)-1,3-butanedione
1,3-diphenyl-1,3-propanedione
1,3-bis(2-chloro-4-methylphenyl)-1,3-propanedione
1,1,1-trifluoro-2,4-pentanedione
1,1,1-trifluoro-4-(2-thienyl)-2,4-butanedione
1-(2-furyl)-1,3-butanedione
1,3-cyclohexanedione
5,5-dimethyl-1,3-cyclohexanedione
4-benzoyl-1,3-cyclohexanedione
acetoacetylaminobenzene
benzoylacetylaminobenzene
acetoacetyl-2-aminonaphthalene
2-ethoxy-1-acetoacetylaminobenzene
4-methoxy-1-acetoacetylaminobenzene
2-ethoxy-4-trifluoromethyl-1-acetoacetylaminobenzene
2-ethoxy-5-methyl-1-acetoacetylaminobenzene 2-cyano-1-acetoacetylaminobenzene
2-bromo-6-methyl-1-acetoacetylaminobenzene
2,4-dimethyl-1-acetoacetylaminobenzene
2-ethoxy-4-bromo-5-methyl-1-acetoacetylaminobenzene
2-ethoxy-4-chloro-6-methyl-1-acetoacetylaminobenzene
2-methoxy-4-trifluoromethyl-1-acetoacetylaminobenzene
2,4-dihydroxyquinoline
2,4-dihydroxy-6-methyl-quinoline
2,4-dihydroxy-8-chloro-quinoline
2,4-dihydroxy-6-methoxy-quinoline
6-bromo-2,4-dihydroxy-quinoline
7-chloro-2,4-dihydroxy-5-methyl-quinoline
3-methyl-1-phenyl-2-pyrazolin-5-one
1-(m-chlorophenyl)-3-methyl-2-pyrazolin-5-one
1-(5-bromo-3-pyridyl)-3-methyl-2-pyrazolin-5-one
1-(2-benzothiazolyl)-3-methyl-2-pyrazolin-5-one
1-(p-ethoxyphenyl)-3-methyl-2-pyrazolin-5-one
1-(p-tolyl)-3-methyl-2-pyrazolin-5-one
1-(m-nitrophenyl)-3-methyl-2-pyrazolin-5-one
3-methyl-1-(2,4,6-trichlorophenyl)-2-pyrazolin-5-one
barbituric acid Additional specific examples of metallizable monoazo dyestuffs of the disperse type derived from diazotized 2-aminopyridine-1-oxides which may be employed in the process of dyeing metal-containing polyolefins in accordance with the present invention include the following:

2-(2,4-dihydroxy-1-phenylazo)-pyridine-1-oxide
2-(5-benzoyl-2,4-dihydroxy-1-phenylazo)-pyridine-1-oxide
2-(2-anilino-1-naphthylazo)-pyridine-1-oxide
2-[(4-hydroxy-m-tolyl)azo]-pyridine-1-oxide
2-(8-acetamido-2-hydroxy-1-naphthylazo)pyridine-1-oxide
2-(4,6-diamino-3-tolylazo)-pyridine-1-oxide
2-(2-hydroxy-1-naphthylazo)-3-methylpyridine-1-oxide
2-(2-hydroxy-1-naphthylazo)-4-methylpyridine-1-oxide
2-(2-hydroxy-1-naphthylazo)-6-methylpyridine-1-oxide
2-(2-hydroxy-1-naphthylazo)-4,6-dimethylpyridine-1-oxide Dyestuffs suitable for use in dyeing α-olefins in accordance with this invention are substantially insoluble in water, and are applied in a conventional manner for disperse dyes. A dispersion of the unmetallized dyestuff, which is in a finely divided state, is added to the aqueous dyebath, maintained at a pH of 3–5, which contains the polyolefin material, dispersing agents and other dyeing adjuvants. Such variables as temperature, dyeing time and concentration of dye are controlled to obtain the desired depth of shape. Although temperatures ranging from 50° C. to the boiling point of the bath may be used, I prefer to operate in the range of 80–95° C. Residence time is not critical and 1½ to 2 hours are generally sufficient. Dye concentrations generally employed may vary widely depending upon the depth of shade desired. Light shades are obtainable with as little as 0.001% of dye, based on the weight of the material while deep shades can be obtained by the use of about 0.1 to 0.3% of pure dye.

The dyestuffs employed for dyeing metal-containing polypropylene by this invention display, surprisingly, improved dyeing behavior, for example, compared with previously mentioned known dyes derived from 8-aminoquinoline and active methylene group coupling components, since presumably, they both are fixed to the fiber by chelation. It is not intended that this invention be limited to any theory of action. However, we believe that a plausible explanation may lie in the difference in temperature at which the two types chelate. The azoquinolinyl dyes build up slowly until the chelation temperature (about 60° C.) is reached, then the buildup of the metallized shade becomes rapid. This often results in poor penetration and surface coloration. The azopyridine-1-oxide dyes, on the one hand, do not appear to chelate until a bath temperature of about 90° C. is reached. This delayed chelation allows a continuous buildup of the unmetallized shade until, at about 90° C., chelation and buildup continue together. This results in good penetration and high levelness. While other factors may be present we believe that this difference in temperature of chelation is the main factor in the improved results obtained with the dyes of this invention.

The following examples will illustrate the preparation of the dyes of this invention.

Example 1

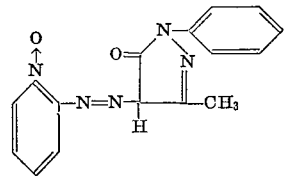

2-[(3-methyl-5-oxo-1-phenyl-2-pyrazolin-4-yl)-azo]-pyridine-1-oxide

A solution of 11.0 g. (0.1 mole) of 2-aminopyridine-1-oxide in 25 ml. of 20° Bé. hydrochloric acid and 600 ml. of water is cooled to 0° C., and 50 ml. of a 2 molar aqueous solution of sodium nitrite is added over a period of about 15 minutes with agitation. The agitation is continued for one hour after which a clear reddish yellow solution is obtained. The diazonium salt solution is then added to a solution of 17.6 g. (0.102 mole) of 3-methyl-1-phenyl-2-pyrazolin-5-one and 40 g. of sodium carbonate in 1 liter of water, over a period of 40 minutes, while maintaining the temperature between 5 and 10° C. The solid product is filtered and washed free of coupler. It is purified further by slurrying in water, acidifying to Delta paper and again filtering and washing with water. The product is obtained as a yellow solid, melting at 195–197° C.

Example 2

Piece goods of nickel-containing polypropylene fiber are scoured, using 0.2% Triton X-100 and 0.2% soda ash, for 10 min. at 90° C. They are then placed in a bath set at 35° C. containing 1% Triton X-100 (based on weight of fiber) and 1.0–1.5% formic acid (pH 3–4) and run for 5 minutes. A 1% (on wt. of fiber) dispersion of the dye from Example 1 is prepared in warm water and added to the dye bath. After 5 minutes, the temperature is raised to 95° over a 30 min. period. The dyeing is continued at 95° C. for an additional 45 minutes. The piece goods are removed from the dye bath, rinsed, and soaped in 0.5% soap solution at 90° for 10 minutes, rinsed with water and dried. The resulting dyed piece goods are colored a deep yellow shade having excellent fastness to light, dry-cleaning, washing and crocking.

Example 3

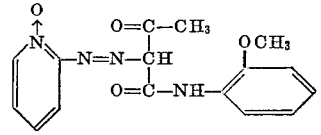

2-[α-(o-methoxyphenylcarbamoyl)acetonyl-azo]pyridine-1-oxide

A cold (0–5° C.) solution containing 0.1 mole of 2-pyridine-1-oxide diazonium chloride, prepared as described in Example 1, is added to a cold, agitated solution consisting of 21.1 g. (0.102 mole) of acetoacet-o-anisidine, 30.0 g. (0.282 mole) of sodium carbonate, 10 ml. (0.192 mole) of 50° Bé. sodium hydroxide solution, and 500 ml. of water, over a 3½ hour period. The temperature is allowed to rise 25° C. and the mixture is stirred for 16 hours. The product is collected on a filter and washed with 2 liters of a 10% salt solution containing 0.5% sodium hydroxide. The cake is then slurried with one 1. of 60° C. water for 2 hours and then acidified with 10% hydrochloric acid. Agitation is continued for 8 hours at 60° C., then the product is filtered, washed with water and dried.

The product of this example, when applied to metal-containing polypropylene in accordance with the procedure described in Example 2, provides excellent penetration and dyes the polypropylene in yellow shades having good levelness, moderate light fastness (10 hrs.) and excellent fastness to washing and dry-cleaning.

Example 4

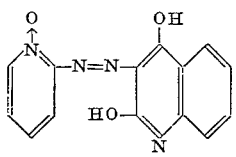

2-(2,4-dihydroxy-3-quinolylazo)-pyridine-1-oxide

A cold solution (0–5° C.) containing 0.1 mole of the diazonium salt described in Example 1, is added while stirring to a cold solution containing 19.52 g. (0.102 mole) of 2,4-dihydroxyquinoline, 30.0 g. (0.282 mole) of sodium carbonate, 10 ml. (0.192 mole) of 50° Bé. sodium hydroxide solution and 500 ml. of water over a period of 2.5 hours. The mixture is stirred at room temperature. The product is isolated, washed and treated as described in Example 2.

When applied to metal-containing polypropylene as described in Example 2, the product demonstrates excellent penetration and produces deep orange shades having excellent levelness. The dyeings exhibit outstanding fastness to washing and dry-cleaning, and moderate light fastness (10 hrs.).

The following tabulation further illustrates the monoazo compounds of my invention and sets forth the colors the nonmetallized compounds yield on metal-containing polypropylene. The dyestuffs were prepared in accordance with the procedure of Example 1. The dyeings on metal-containing polypropylene were carried out in accordance with the procedure of Example 2.

wherein R represents a substituent selected from the group consisting of lower alkyl, lower alkoxy, halogen and nitro; $n$ is an integer of 0 to 3 and C represents the residue of a coupling component selected from the group consisting of 2,4-dihydroxyquinolines and compounds containing the radical —$CH_2$—CO— which are 1,3-diketones or pyrazolones, capable of undergoing keto-enol tautomersion and free of water solubizing substituents.

3. The dyestuffs of claim 2 wherein $n$ is 0 and C is a 1-aryl-3-lower alkyl-2-pyrazolin-5-one.

4. The dyestuffs of claim 2 wherein $n$ is 0 and C is a 1,3-lower alkane dione.

5. The dyestuffs of claim 2 wherein $n$ is 0 and C is a 2,4-dihydroxyquinoline.

6. The dyestuff of the formula:

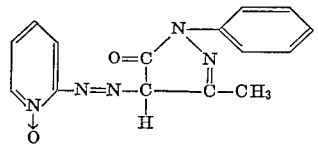

7. The dyestuff of the formula:

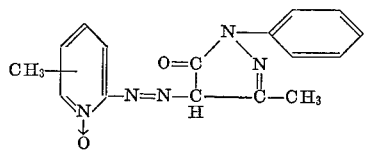

8. The dyestuff of the formula:

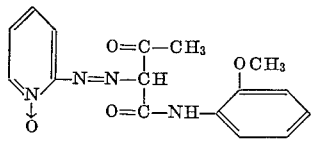

| Amine Used for Diazo Component | Coupler | Product | Shade |
| --- | --- | --- | --- |
| 2-aminopyridine-1-oxide | 2,4-pentanedione | 2-(2,4-dioxo-3-pentylazo)-pyridine-1-oxide | Yellow. |
| Do | 5,5-dimethyl-1,3-cyclohexanedione | 2-[(1,3-dioxo-5,5-dimethyl-2-cyclohexyl)azo]-pyridine-1-oxide | Do. |
| 2-amino-3-methylpyridine-1-oxide | 3-methyl-1-phenyl-2-pyrazolin-5-one | 2-[(3-methyl-5-oxo-1-phenyl-2-pyrazolin-4-yl)azo]-3-methylpyridine-1-oxide | Reddish yellow. |
| 2-amino-4-methylpyridine-1-oxide | do | 2-[(3-methyl-5-oxo-1-phenyl-2-pyrazolin-4-yl)azo]-4-methylpyridine-1-oxide | Do. |
| 2-amino-6-methylpyridine-1-oxide | do | 2-[(3-methyl-5-oxo-1-phenyl-2-pyrazolin-4-yl)azo]-6-methylpyridine-1-oxide | Medium reddish yellow. |
| 2-amino-4,6-dimethylpyridine-1-oxide | do | 2-[(3-methyl-5-oxo-1-phenyl-2-pyrazolin-4-yl)azo]-4,6-dimethyl-pyridine-1-oxide | Dark reddish yellow. |
| 2-aminopyridine-1-oxide | β-Naphthol | 2-(2-hydroxy-1-naphthylazo)-pyridine-1-oxide | Violet. |
| Do | p-Cresol | 2(2-hydroxy-4-methyl phenylazo)-pyridine-1-oxide | Grey. |

I claim:
1. Water-insoluble monoazo dyestuffs of the formula:

A—N=N—C wherein A is a pyridine-1-oxide residue and C is the residue of a coupling component selected from the group consisting of 2,4-dihydroxyquinolines and compounds containing the radical —$CH_2$—CO— which are 1,3-diketones or pyrazolones, capable of undergoing keto-enol tautomerism and free of water solubilizing substituents.

2. Water-insoluble monoazo dyestuffs of the formula:

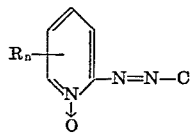

9. The dyestuff of the formula:

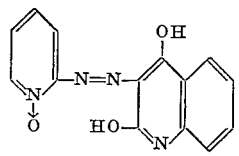

References Cited

FOREIGN PATENTS 642,346  1/1964  Belgium.

FLOYD D. HIGEL, *Primary Examiner.*